Nov. 26, 1968     A. L. NEDLEY     3,412,615
METHOD OF CONTROLLING VIBRATIONS OF WHEEL AND TIRE ASSEMBLIES
Filed Sept. 30, 1965

INVENTOR.
Alva Lloyd Nedley
BY
Hugh L. Fisher
ATTORNEY

United States Patent Office

3,412,615
Patented Nov. 26, 1968

3,412,615
METHOD OF CONTROLLING VIBRATIONS OF WHEEL AND TIRE ASSEMBLIES
Alva Lloyd Nedley, Troy, Mich., assignor to General Motors Corporation, Detroit, Mich., a corporation of Delaware
Filed Sept. 30, 1965, Ser. No. 491,642
8 Claims. (Cl. 73—458)

ABSTRACT OF THE DISCLOSURE

Method and apparatus by which a vehicle wheel and tire assembly is maintained in engagement with a rotatable drum by a load that proximates that when the assembly is mounted on a vehicle. The drum is rotated at a speed which causes vibrations from runout of the assembly to occur at their resonant frequency. The amplitude of these vibrations and their angular disposition relative to a reference point on the assembly are determined and utilized in establishing the value and location of an appropriate compensating weight or weights. The weight corrects for and nulls the loaded radial runout produced vibrations and also can correct for static unbalance if present.

---

This invention relates to a method of controlling vibrations of a spring-mass vibrating system and, more particularly, to a method for controlling vibrations of a wheel and tire assembly of the type adapted, although not exclusively, for use with motor vehicles.

So-called "road shake" in motor vehicles is always objectionable, and particularly when it occurs on a smooth superhighway-type of road. Road shake often persists even though each of the vehicle's wheel and tire assemblies has been accurately balanced both dynamically and statically. In endeavoring to overcome the road shake it has been discovered that loaded radial runout, which results in what might be referred to as "wheel hop," is a major cause.

The invention, therefore, contemplates a novel method of reducing the vibrations of a spring-mass system and, particularly, of wheel and tire assemblies. More specifically, the method contemplates correction of loaded radial runout of wheel and tire assemblies. The novel method comprehends not only correcting for loaded radial runout but also for static unbalance.

The foregoing and other objects and advantages of the invention become apparent from the following description and from the accompanying drawings in which.

Figure 1:
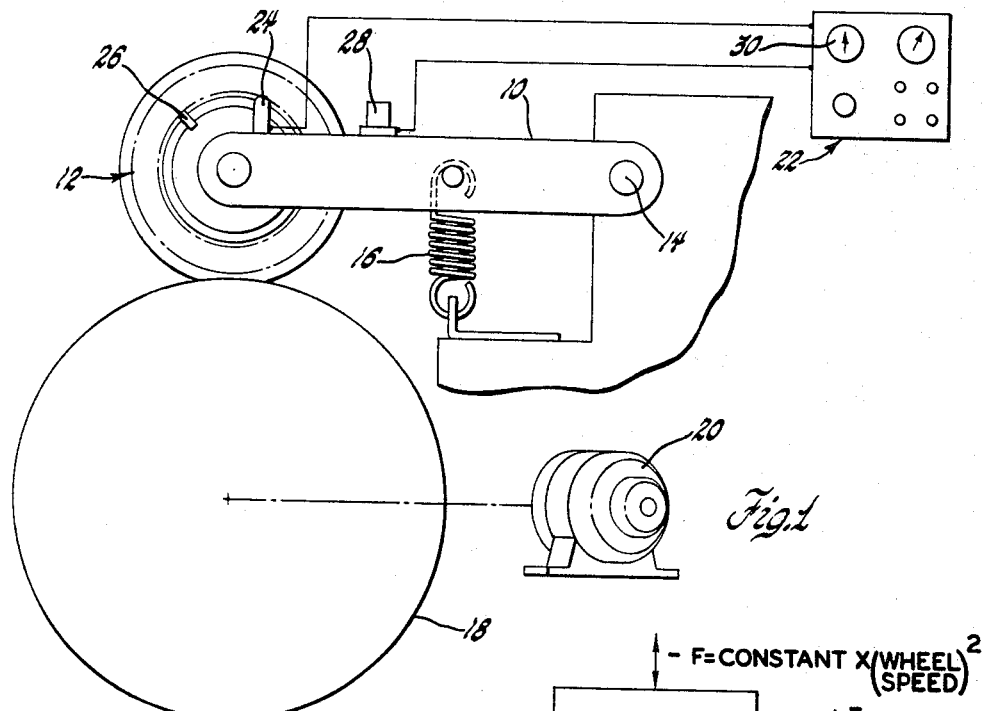
FIGURE 1 illustrates, somewhat schematically, apparatus for carrying out the method.

The FIGURE 1 apparatus includes an arm 10 for revolvably supporting a wheel and tire assembly, denoted generally by the numeral 12, to be checked. The assembly 12 includes the usual flexible tire and its supporting wheel. Normally the tire will be of some pneumatic type. The arm 10 is pivotally supported at 14. A hold-down spring 16 urges the wheel and tire assembly 12 into peripheral engagement with a driving surface on a true rotatable drum 18. The compressive load imposed by the hold-down spring 16 on the wheel and tire assembly 12 is selected so as to be substantially equal to the load that the vehicle will impose upon the assembly 12 when installed. A drive motor 20, of any conventional kind that permits speed adjustments, revolves the drum 18.

The mounting of the wheel and tire assembly 12 is such that any runout movements of the assembly 12 are in a vertical plane, substantially parallel to or aligned with the plane established by the rotational axis of the assembly 12 and the drum 18. The drum 18 is revolved at a speed that will cause the loaded radial runout force to act at or slightly above the wheel hop resonant frequency. Of course, the driving surface does not have to be that on the drum 18 but may be a surface having, e.g., rectilinear movement, or a series of rollers may be employed. Furthermore, it should be appreciated that a wheel can be checked while on the vehicle by producing the required rotation of the wheel with a suitable driving surface and, of course, while the vehicle is maintained stationary.

These movements, specifically the deflections of the rotational axis of the wheel and tire assembly 12, are monitored with an appropriate indicator unit, designated generally by the numeral 22. This unit 22 may be of any suitable type, such as that disclosed in the patent to King, 2,988,918. As illustrated, a reference pickup 24, which may employ some type of light responsive unit, such as a photocell, to develop in conjunction with an appropriate marker 26 a reference signal. This reference signal will have a frequency corresponding to the angular velocity of the assembly 12 and will afford an electrical reference, which can be compared with a runout signal developed by a suitable vibration pickup 28 mounted on the arm 10. The pickup 28 senses the displacements of the rotational axis of the assembly 12 and thus the first harmonic of the wheel hop or runout. The pickup 28 may be of another type, such as a capacitive or an inductive pickup, arranged at a proper location relative to the assembly 12 to sense these displacements. The difference in phase between the reference and runout signals angularly locates the runout, whereas the amplitude of the runout signal indicates the amount of runout. Both of these values can be visually read out directly from calibrated dials 30.

To understand the problem and its solution, reference will be made to the apparatus of FIGURE 1 and the FIGURE 2 diagram. Also, it will be assumed that the wheel and tire assembly 12 has been statically balanced and, further, that the assembly 12 has a high spot at the tire periphery in exact radial alignment with the marker 26. When this high spot strikes the surface of the drum 18 the entire assembly 12 will rise or move upwardly. This action perhaps can be better visualized by considering the assembly 12 as being a cam, and at this high spot is the peak of a lobe of the cam. Thus, the engagement of the lobe of the cam with the surface of the drum 18 will cause the cam and its supporting structure to be moved upwardly. With a pneumatic tire this action results in a hop of the wheel, i.e., the rotational axis of the assembly will be displaced upwardly once per each revolution of the assembly 12. These high spots or their equivalent can be caused by imperfections in the pneumatic tire, such as hard spots, tread splices, cord overlap, etc., by eccentricities in the supporting rim for the tire, and by other defects that will readily occur to those versed in the art. Necessarily, as can be appreciated, this type of imperfection would not be detected during dynamic balancing, primarily because the unbalance being detected is that causing the wheel to, in effect, wobble; whereas the imperfection or the cause of static unbalance is excess weight at a certain point which may or may not, as will subsequently be explained, produced loaded radial runout or, as it has just been referred to, wheel hop.

Figure 2:
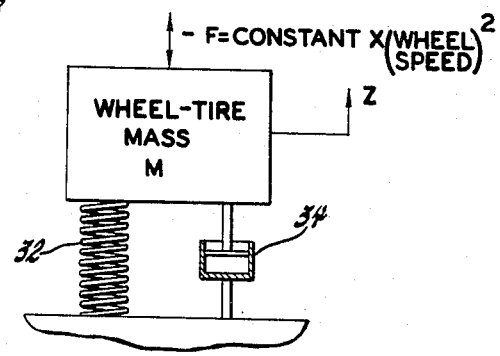
FIGURE 2 is a diagram for illustrating the principles involved in loaded radial runout correction.

The compensation or correction for wheel hop will initially be described while making certain assumptions relative to the diagram of FIGURE 2. It will first be assumed that the displayed mass M equals that of the wheel and tire assembly 12. Next, it is assumed that the spring 32 corresponds to the flexibility of the pneumatic tire and the dashpot 34 to the damping from the tire. If this spring-mass system is vibrated in the plane Z at a constant displacement amplitude at the bottom of the spring with a varying frequency applied to the spring 32, the constant displacement will correspond to the first harmonic of the radial runout of the wheel and tire assembly. In FIGURE 2 this is equivalent to a wheel with no runout traveling over a sine wave contoured road. The frequency of the vibrations will be proportional to wheel rotational speed or road speed. Now another force is applied directly to the mass, such as the addition of a weight to the assembly 12 in FIGURE 1. This latter force will be equal to the multiple of a constant proportional to the weight and the square of the wheel speed. If the absolute motion of the mass produced by the weight and the amount of displacement of the bottom of the spring 32 produced by radial runout are equal but opposite in phase, the force of the weight will null or reduce to zero the compressions of the spring or tire from runout at all speeds.

Figure 4:
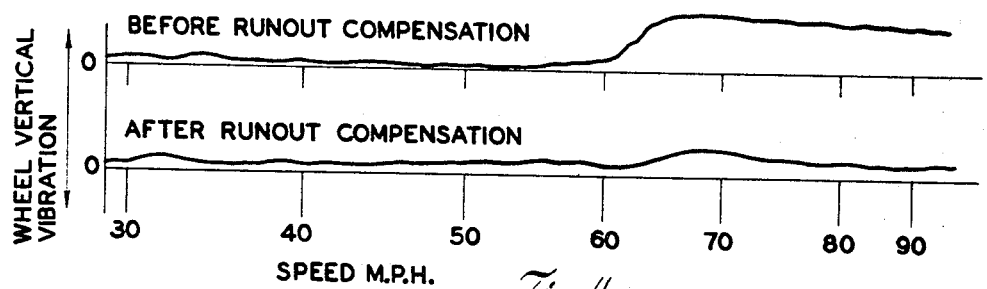
FIGURE 4 is a graph demonstrating the amplitude of the wheel and tire assembly vibrations before and after compensation for loaded radial runout.

Relating this foregoing explanation again to the FIGURE 1 apparatus, if a weight of an amount determined by the amplitude of the vibrations is added to the assembly 12 at the zero point established by the marker 26, which has been indicated as also the point of occurrence of the high spot in a statically balanced assembly, the centrifugal force developed by the weight will oppose the vertical or lifting movement produced by the high spot. One-half of a revolution later this same weight acts in the same way but now to oppose downward movement of the assembly 12. In other words, if the high spot on the assembly 12 engages the surface of the drum 18, the assembly 12 will rise. One-half of a revolution later the assembly 12 will be falling. The weight at both times opposes movement of the assembly 12 and, therefore, the rotational axis has the oscillations substantially nulled. This is demonstrated in FIGURE 4 where the curve designated "before runout compensation" shows that between 60 and 70 miles per hour the amplitude of the runout is maximum. The curve designated "after runout compensation" shows the amplitude as being substantially constant throughout the entire range of speeds.

Figure 3:
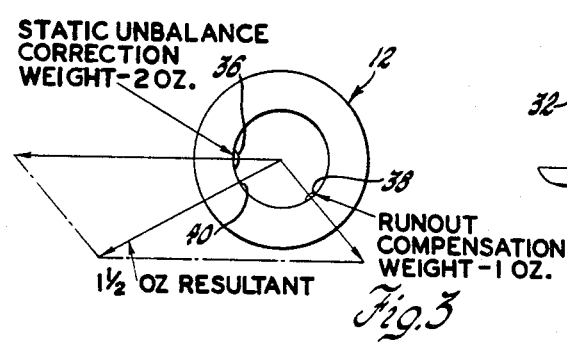
FIGURE 3 is a diagrammatic showing of a wheel used to illustrate the way in which correction weights may be added and how they afford both static unbalance correction and runout compensation.

The diagram in FIGURE 3 facilitates an understanding of how a single correction for this loaded radial runout will also compensate for static unbalance, if any. In this diagram a two ounce weight 36 has been added to the assembly 12 at the indicated point to correct for a condition of unbalance produced by the heavy area 180° opposite from the two ounce weight 36. The runout compensation weight 38 of one ounce has been added at the exact point of occurrence of the cause of the wheel hop or loaded radial runout.

At this point it will be easily understood why the static unbalance correction alone does not per se provide runout compensation and, in fact, will usually cause it to be aggravated. Assume that the heavy part of the assembly 12 occurred at the point where the runout compensation weight 38 is shown. The static unbalance correction weight 36 then should be properly positioned on the assembly 12 directly opposite from the point of the weight 38 or 180° displaced therefrom. With the weight in this position and with the high spot occurring at the point of 38, it can be seen that the correction weight 36 would actually add to the force of the loaded radial runout because the centrifugal force therefrom would increase the vertical displacement or increase the wheel hop in exact synchronism with the high spot.

Continuing with the explanation of how the single correction for loaded radial runout will also compensate for static unbalance, by the vector diagram illustration, the equivalent of the two weights 36 and 38 can be accomplished by installing a single one and one-half ounce resultant weight at a point 40 determined by triangulation. Thus, with the installation of the one and one-half ounce weight at point 40, both the effect of static unbalance and loaded radial runout can be and will be compensated. The indicator unit 22 would indicate the amount of this weight to be added. As can be appreciated, this requires only one weight and eliminates the need for two checks of the assembly 12, i.e., one for static unbalance and another for loaded radial runout.

Also, it should be kept in mind that runout may produce static unbalance. Therefore, the resultant runout from both static unbalance and high spots, eccentricities, etc., is sensed by the unit 22 and simultaneous correction can be made.

Describing now the method with the foregoing principles in mind and with relation to the FIGURE 1 apparatus, it will be assumed that the wheel and tire assembly 12 has been installed so that the rotational axis of the assembly 12 can move in a substantially vertical plane. Any loaded radial runout of the assembly 12 will then by typical of those in the vehicle, but without compensating for other factors such as runout of wheel hub pilots. Also, it will be assumed that the assembly 12, contrary to the aforedescribed description, has not been statically balanced; hence, the weight will not be normally installed at the exact point of occurrence of the high spot that produces the wheel hop.

To ascertain the maximum amplitude of the runout it is necessary that the drive motor 20 revolve the drum 18 and, accordingly, the wheel and tire assembly 12 at the previously mentioned proper speed. This speed must be such that the runout or wheel hop in the plane of measurement is at its resonant frequency so that the amplitude of these deflections is maximum. Because there is a phase lag at resonance, i.e., the maximum amplitude of the vibrations occurs due to inertia effects 90° after the high point engages the drum 18. It is preferable that the operating frequency be slightly above the resonant frequency so that there is no hunting. Otherwise, if the speed is allowed to vary slightly so that the runout frequency is occasionally just below the resonant frequency there will be erratic readings. In this substantially vertical plane the first harmonic of the runout is measured by the indicator unit 22. Both the phase and the amplitude of the first harmonic of the runout, as has been explained, include that produced by static unbalance. Corresponding compensation weights are selected, i.e., for runout with this amplitude. The angular location of the weights is automatically determined by the unit 22, which is calibrated to take into consideration the mentioned 90° phase shift at resonance, and as also mentioned the location will normally be other than at the location of the high spot, or if the assembly 12 corresponds to that in FIGURE 3 the compensation weight will be placed at the point 40.

If the amount of correction or compensation is not too great only one weight needs to be added to the rim of the assembly's wheel. On the other hand, if the correction is quite substantial and to avoid dynamic unbalance, two weights are added, one on each of the axially opposite sides of the rim.

The compensated assembly 12 now will perform as mentioned before. The weights oppose the rising of the assembly 12, such as produced by a high spot on the tire and/or by static unbalance, and also tend to lift the assembly 12 when one-half of a revolution later the assembly 12 tends to fall.

From the foregoing it will be appreciated that the source of wheel shake problem, loaded radial runout, has been determined and corrected. Further, when correction for the loaded radial runout is made, static unbalance can also be corrected.

The invention is to be limited only by the following claims.

What is claimed is:

1. The method of controlling the vibrations of a wheel and tire assembly due to loaded radial runout comprising the steps of revolving the assembly under load against a surface so as to induce vibrations of the assembly at the resonant frequency thereof in a certain plane, determining the angular disposition of the source of those vibrations producing loaded radial runout of the assembly relative to a reference point on the assembly and also the amplitude, and adding a compensating weight to the assembly proximate to the determined angular disposition of the source so as to substantially null the vibrations and thereby compensate for loaded radial runout.

2. The method of determining the vibrations produced by loaded radial runout of a wheel and tire assembly comprising the steps of revolving the assembly under load against a surface so as to induce vibrations of the assembly at the resonant frequency thereof in a certain plane and determining the angular disposition of the source of those vibrations producing loaded radial runout of the assembly relative to a reference point on the assembly and also the amplitude by measuring the vibrations of the rotational axis of the assembly so as to establish the value and location of a compensating weight that will substantially null the vibrations and thereby compensate for loaded radial runout of the assembly.

3. The method of controlling movements of a wheel and tire assembly due to loaded radial runout comprising the steps of movably mounting the wheel and tire assembly so as to have a certain compressive peripheral engagement with a driving surface, maneuvering the driving surface so as to revolve the wheel and tire assembly at an angular velocity that will cause movements of the wheel and tire assembly in a certain plane to be substantially at the resonant frequency thereof, determining the angular disposition of the source and the amplitude of the movements of the wheel and tire assembly in the certain plane relative to a reference point on the assembly, and adding a compensating weight to the wheel and tire assembly proximate the angular disposition of the source of a value that will reduce loaded radial runout of the wheel and tire assembly in the certain plane.

4. The method of controlling movements of a wheel and tire assembly due to loaded radial runout in a certain plane comprising the steps of movably mounting the wheel and tire assembly so as to be in peripheral engagement with a driving surface, applying a predetermined compression load to the wheel and tire assembly, maneuvering the driving surface so as to revolve the wheel and tire assembly at an angular velocity that will cause movements of the wheel and tire assembly in a certain plane substantially at the resonant frequency thereof, determining the angular disposition of the source and of the amplitude of the movements of the wheel and tire assembly in the certain plane relative to a reference point on the assembly, and adding a compensating weight to the wheel and tire assembly proximate the angular disposition of the source and of a value that will compensate for the source and thereby reduce loaded radial runout of the wheel and tire assembly in the certain plane.

5. The method of correcting for loaded radial runout in wheel and tire assemblies comprising the steps of movably mounting the wheel and tire assembly in peripheral engagement with a driving member, applying a predetermined compressive load to the wheel and tire assembly, revolving the driving member so as to rotate the wheel and tire assembly at an angular velocity that will cause the loaded radial runout of the wheel and tire assembly in a certain plane to be at the resonant frequency thereof, determining the phase and amplitude of the first harmonic of the loaded radial runout of the wheel and tire assembly in the certain plane relative to a reference point on the assembly, and adding a pair of compensating weights to the wheel on axially opposite sides thereof of values and at an angular location determined respectively by the phase and the amplitude of the first harmonic of the loaded radial runout of the wheel and tire assembly so as to substantially null the loaded radial runout.

6. The method of controlling vibrations of wheel and tire assemblies due to static unbalance and loaded radial runout comprising the steps of movably mounting the wheel and tire assembly so as to produce a predetermined compressive peripheral engagement with a driving surface, maneuvering the driving surface so as to revolve the wheel and tire assembly at an angular velocity that will cause oscillations of the rotational axis of the wheel and tire assembly in a certain plane to be substantially at the resonant frequency thereof, determining the phase and amplitude of the first harmonic of the oscillations in the certain plane relative to a reference point on the assembly, and adding a compensating weight to the wheel and tire assembly of a value and at a location determined by the first harmonic so as to reduce the oscillations and thereby correct both for static unbalance and loaded radial runout.

7. The method of controlling vibrations of wheel and tire assemblies due to static unbalance and loaded radial runout comprising the steps of movably mounting the wheel and tire assembly so as to be in peripheral engagement with a driving surface, applying a predetermined compressive load to the wheel and tire assembly, maneuvering the driving surface so as to revolve the wheel and tire assembly at an angular velocity that will cause oscillations of the rotational axis of the wheel and tire assembly in a certain plane to be at the resonant frequency thereof, determining the phase and amplitude of the first harmonic of the oscillations in the certain plane relative to a reference point on the assembly, and adding a compensating weight to the wheel and tire assembly of a value and at a location determined by the first harmonic so as to cause the oscillations to be substantially nulled and thereby compensate both for static unbalance and loaded radial runout.

8. The method of controlling vibrations of wheel and tire assemblies due to static unbalance and loaded radial runout comprising the steps of movably mounting the wheel and tire assembly so as to be in peripheral engagement with a revolving driving member, applying a predetermined compression load to the wheel and tire assembly, revolving the driving member so as to rotate the wheel and tire assembly at an angular velocity that will cause oscillations of the rotational axis of the wheel and tire assembly in a certain plane to be at the resonant frequency thereof, determining the phase and amplitude of the first harmonic of the oscillations in the certain plane relative to a reference point on the assembly, and adding a pair of compensating weights to the wheel on axially opposite sides thereof at a location and of amounts determined by the first harmonic of the oscillations so as to substantially null the oscillations and thereby correct both loaded radial runout and static unbalance of the wheel and tire assembly.

References Cited

UNITED STATES PATENTS

| | | | |
|---|---|---|---|
| 2,914,940 | 12/1959 | Elliott et al. | 73—146 |
| 3,164,994 | 1/1965 | Merrill et al. | 73—457 |
| 3,238,785 | 3/1966 | Lodge et al. | 73—457 |

FOREIGN PATENTS

| | | |
|---|---|---|
| 165,008 | 1/1950 | Austria. |
| 1,305,381 | 8/1962 | France. |

OTHER REFERENCES

German Application 1,115,054, by Hofmann, October 1961, 1 sht. dwgs., 2 pages of specifications.

JAMES J. GILL, *Primary Examiner.*